(12) United States Patent
Burkholder

(10) Patent No.: US 9,090,157 B2
(45) Date of Patent: Jul. 28, 2015

(54) SPILL AVOIDANCE SYSTEM FOR STORAGE TANK

(75) Inventor: Steve Burkholder, Annapolis, MD (US)

(73) Assignee: Myers Industries, Inc., Akron, OH (US)

(*) Notice: Subject to any disclaimer, the term of this patent is extended or adjusted under 35 U.S.C. 154(b) by 948 days.

(21) Appl. No.: 13/021,097

(22) Filed: Feb. 4, 2011

(65) Prior Publication Data
US 2011/0186571 A1 Aug. 4, 2011

Related U.S. Application Data

(60) Provisional application No. 61/301,474, filed on Feb. 4, 2010.

(51) Int. Cl.
| | |
|---|---|
| B60K 15/04 | (2006.01) |
| B65D 90/24 | (2006.01) |
| B65D 90/34 | (2006.01) |
| B65D 90/50 | (2006.01) |
| B63B 17/00 | (2006.01) |
| F02M 37/00 | (2006.01) |

(52) U.S. Cl.
CPC .............. B60K 15/04 (2013.01); B65D 90/24 (2013.01); B65D 90/34 (2013.01); B65D 90/50 (2013.01); B63B 17/0036 (2013.01); F02M 37/0082 (2013.01)

(58) Field of Classification Search
CPC ........ B67D 7/362; B67D 7/365; B67D 7/367; B60K 15/04
USPC ........... 141/5, 46, 59, 95, 198, 199, 201, 205, 141/302; 220/86.1, 86.2; 137/587, 588
See application file for complete search history.

(56) References Cited

U.S. PATENT DOCUMENTS

| | | | |
|---|---|---|---|
| 3,103,958 A | 9/1963 | Rath | |
| 3,618,643 A * | 11/1971 | Thomson et al. | 141/198 |

(Continued)

FOREIGN PATENT DOCUMENTS

| | | |
|---|---|---|
| EP | 0437142 | 7/1991 |
| JP | 07291389 | 11/1995 |
| WO | WO 2007002077 A2 * | 1/2007 |

OTHER PUBLICATIONS

International Search Report; Corresponding Application Serial No. PCT/US2011/023720; International Filing Date Feb. 4, 2011; Authorized Officer Park, Woo Chung; Korean Intellectual Property Office.; Issued Sep. 8, 2011. (8 pages).

(Continued)

*Primary Examiner* — Timothy L Maust
(74) *Attorney, Agent, or Firm* — Benesch Friedlander Coplan & Aronoff LLP

(57) ABSTRACT

A system for preventing overflow in a storage tank which is fillable via a nozzle includes a nozzle receiver configured to fit within a fill passage of a storage tank. The system further includes at least one seal disposed in the nozzle receiver configured to seal the nozzle within the nozzle receiver. The system has a first passage and a second passage. The first passage is configured to fit at least partially within the fill passage of a storage tank and receive at least a portion of a flow of liquid from the nozzle. The second passage is in communication with the first passage. The system also includes a valve having a first position that directs liquid to flow through the first passage and a second position that directs liquid to flow through the second passage.

16 Claims, 6 Drawing Sheets

(56) References Cited

U.S. PATENT DOCUMENTS

| | | | |
|---|---|---|---|
| 4,441,533 A | | 4/1984 | Snyder et al. |
| 4,526,216 A | | 7/1985 | Lake, Jr. |
| 4,700,864 A | | 10/1987 | Galles et al. |
| 4,765,504 A | | 8/1988 | Sherwood et al. |
| 4,768,566 A | * | 9/1988 | Ito et al. .................. 220/86.2 |
| 4,836,835 A | | 6/1989 | Harris |
| 4,877,146 A | * | 10/1989 | Harris ...................... 220/746 |
| 5,090,459 A | * | 2/1992 | Aoki et al. .................. 141/59 |
| 5,244,022 A | * | 9/1993 | Gimby ........................ 141/301 |
| 5,271,438 A | | 12/1993 | Griffin et al. |
| 5,297,595 A | | 3/1994 | Haile et al. |
| 5,474,048 A | * | 12/1995 | Yamazaki et al. ........... 123/519 |
| 5,570,730 A | | 11/1996 | Keehn et al. |
| 5,669,361 A | * | 9/1997 | Weissinger et al. ........... 123/520 |
| 5,730,194 A | | 3/1998 | Foltz |
| 5,944,069 A | | 8/1999 | Nusbaumer et al. |
| 5,947,153 A | * | 9/1999 | Bucci et al. .................. 137/588 |
| 5,975,154 A | | 11/1999 | Bennett |
| 5,979,417 A | * | 11/1999 | Hyodo et al. ................. 123/516 |
| 6,269,832 B1 | * | 8/2001 | Besnard et al. ............... 137/137 |
| 6,729,367 B2 | | 5/2004 | Peterson |
| 7,757,729 B2 | | 7/2010 | Smith et al. |
| 7,793,682 B2 | * | 9/2010 | Smit ............................. 137/391 |
| 7,886,781 B2 | * | 2/2011 | Burkholder ................... 141/198 |
| 2003/0089422 A1 | * | 5/2003 | Bacchio ........................ 141/95 |
| 2007/0144612 A1 | | 6/2007 | Burkholder |
| 2009/0236350 A1 | | 9/2009 | Miura |

OTHER PUBLICATIONS

International Search Report; Corresponding Application Serial No. PCT/US06/23966; International Filing Date Jun. 21, 2006; Authorized Officer Maust, Timothy L.; Issued Dec. 15, 2006. (5 pages).

Notice of Allowance and Issue Fee(s) Due; Corresponding U.S. Appl. No. 11/993,074, filed Feb. 14, 2008; Examiner Maust, Timothy L.; Dated Oct. 14, 2010. (7 pages).

* cited by examiner

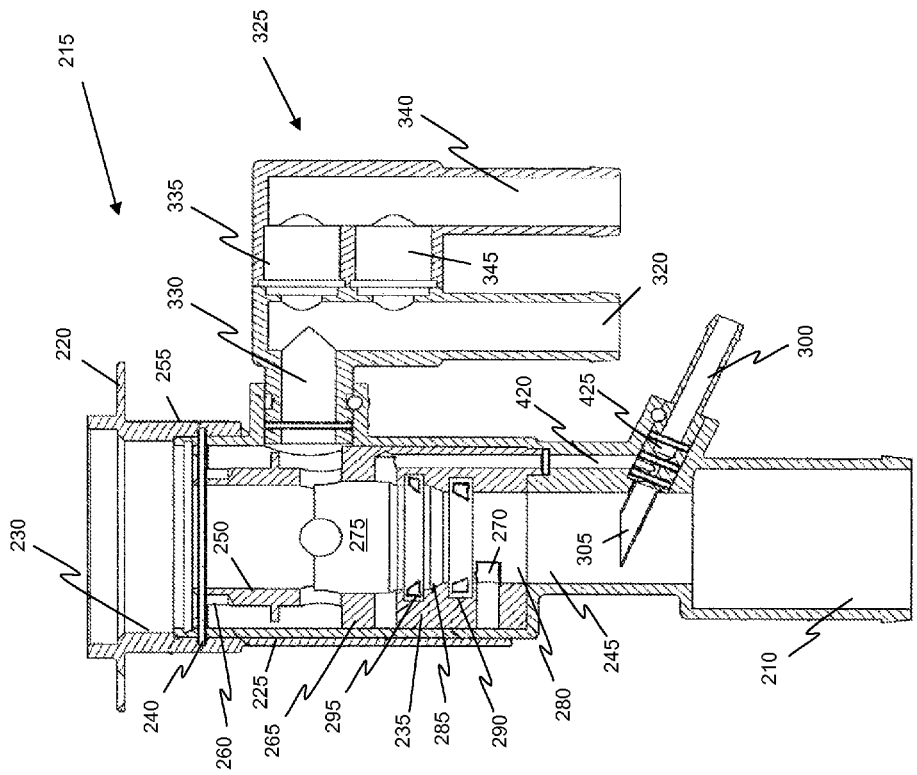
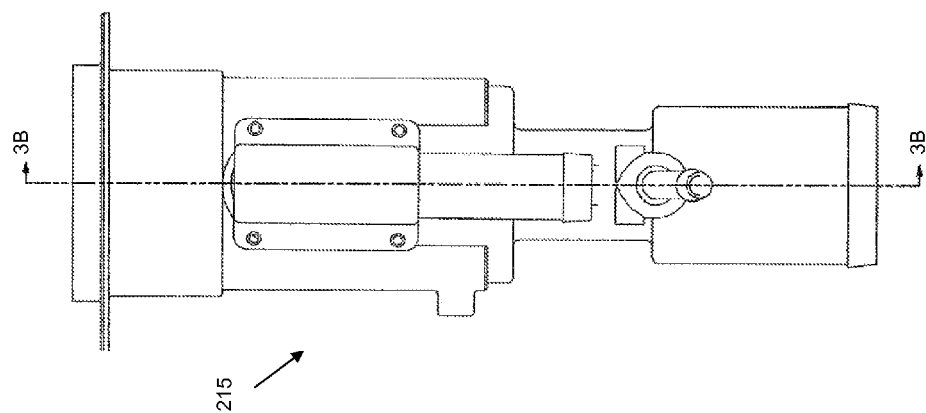
Fig. 3B
Fig. 3A

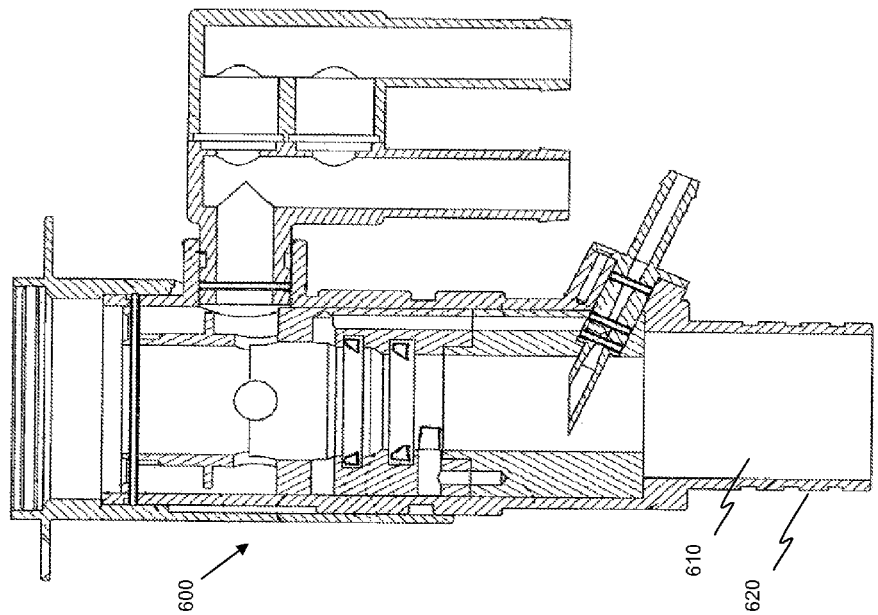
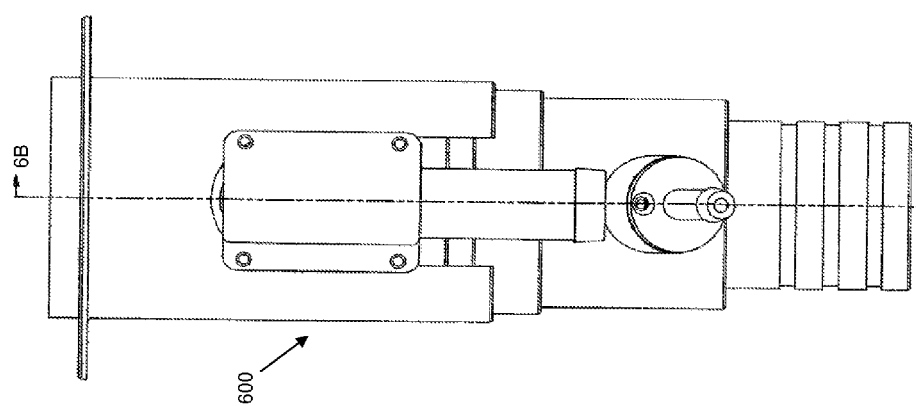
Fig. 6B
Fig. 6A

SPILL AVOIDANCE SYSTEM FOR STORAGE TANK

CROSS REFERENCE TO RELATED APPLICATIONS

This application claims the benefit of priority of U.S. Provisional Application No. 61/301,474 filed on Feb. 4, 2010. The entirety of this Application is incorporated herein by reference.

FIELD OF INVENTION

The present application relates to the field of storage tanks. More particularly, the present application relates to a system and method for preventing overflow during and subsequent to filling of a storage tank.

BACKGROUND

Storage tanks for holding a variety of fluids such as oil, gasoline, and diesel fuel are known in the art. An internal fuel tank on a marine vessel is an example of such a storage tank. Such a fuel tank may be provided with a vent to enable vapor and fumes to escape under pressure while fuel is being pumped into the fuel tank via a fuel fill tube. As the engine consumes fuel, air is drawn into the tank via the vent to fill the space from the consumed fuel. Venting also accommodates expansion of the fuel when it is heated. During filling of the fuel tank, some fuel may be discharged through the vent into the water if a person attempts to fill the tank to capacity.

The use of fuel dispensing nozzles that automatically shut off the flow of fuel to the tank when the tank is full have been used to avoid fuel spillage during filling. These nozzles may operate by sensing a pressure change at an end of the nozzle that results from fuel backing up within the tank fill tube.

A prior art nozzle 10 is illustrated in FIG. 1. Fuel is pressurized in the nozzle passage 1 by a pump (not shown). The flow of fuel is blocked in the nozzle 10 by a valve 3 that is held in a closed position by a spring 2. The valve 3 is connected to a hand-operated trigger 4 at a pivot point 5. The trigger 4 is also connected to a piston 6 at a second pivot point 7. The piston 6 is locked in a dispensing position by a pin 8 that forces balls 9 into a groove in the nozzle housing 11. The pin 8 is connected to a diaphragm 12 that is held in position by a second spring 13. When fuel is dispensed, the trigger 4 is lifted, lifting the pivot point 5 and the valve 3, allowing fuel to flow. The fuel travels to a venturi 15 where a spring loaded ball and seat create a vacuum in a passage 16 that is in communication with the diaphragm 12.

The passage 16 is also open to atmospheric pressure through an aspirator hole 17 near the end of the dispensing nozzle. When fuel is being dispensed, the pressure in the passage 16 is lowered by the venturi 15, but is replaced by atmospheric pressure through the aspirator hole 17 in the nozzle. During conventional automatic shut-off, when the aspirator hole 17 is covered by fuel surging up from the tank's fill tube, the pressure drops in the passage 16, drawing the diaphragm 12 against the second spring 13, and the pin 8 is lifted from its locking position. Thus, the piston 6 moves to release the pivot point 7 in the trigger. When the pivot point 7 is moved, the trigger 4 is ineffective and the spring 2 pushes the valve 3 into the closed position, stopping the flow of fuel.

SUMMARY OF THE INVENTION

A system for preventing overflow in a storage tank which is fillable via a nozzle includes a nozzle receiver configured to fit within a fill passage of a storage tank. The system further includes at least one seal disposed in the nozzle receiver configured to seal the nozzle within the nozzle receiver. The system has a first passage and a second passage. The first passage is configured to fit at least partially within the fill passage of a storage tank and receive at least a portion of a flow of liquid from the nozzle. The second passage is in communication with the first passage. The system also includes a valve having a first position that directs liquid to flow through the first passage and a second position that directs liquid to flow through the second passage.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 3A illustrates a front view of one embodiment of a fill fitting 215 of the fuel spill avoidance system 200;

FIG. 3B illustrates a cross-section of the fill fitting 215;

FIG. 6A illustrates a front view of an alternative embodiment of a fill fitting 600; and FIG. 6B illustrates a cross-section of the fill fitting 600.

DETAILED DESCRIPTION

According to exemplary embodiments of the present invention, a fuel spill avoidance system activates a shutoff mechanism of a fill nozzle when fuel in a fuel tank reaches a predetermined level. The predetermined level is selected to be reached before the level at which the fill nozzle would shut off in the absence of the system. By shutting off fuel flow when the level of fuel in the tank is at a lower level, spillage can be minimized or completely avoided. It should be understood that the present invention is not limited to fuel tanks, but may include any other type of tank to be filled.

Figure 2:
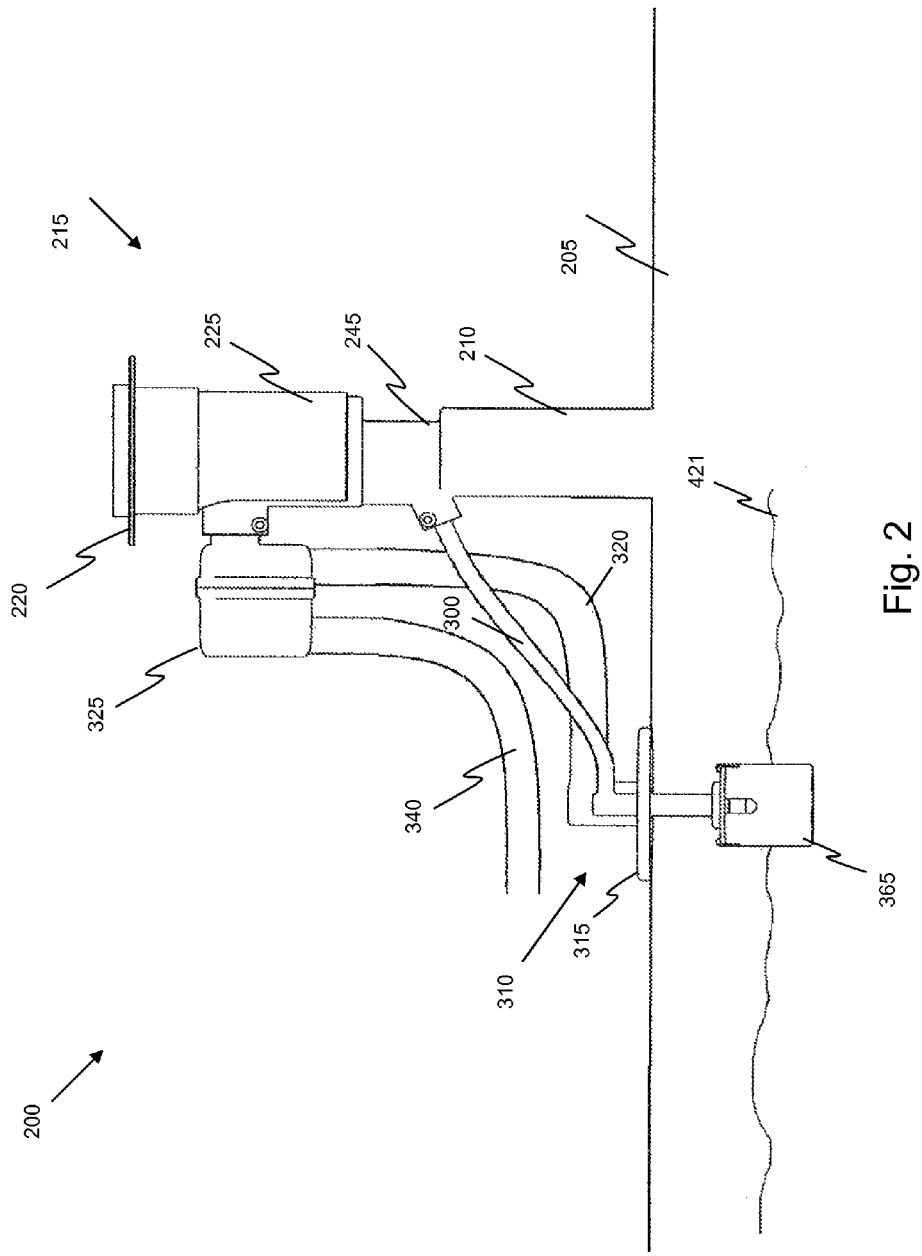
FIG. 2 illustrates one embodiment of a fuel spill avoidance system 200.

FIG. 2 illustrates one embodiment of a liquid spill avoidance system 200. A fuel tank 205 connects to a fill passage 210 through which the fuel tank 205 may be filled. The term "fill passage" refers to a passage from a storage tank to the exterior of a vehicle for the purposes of filling the storage tank. It may also be referred to as a fill hose or fill tube. The fill passage 210 may be flexible.

Figure 1:
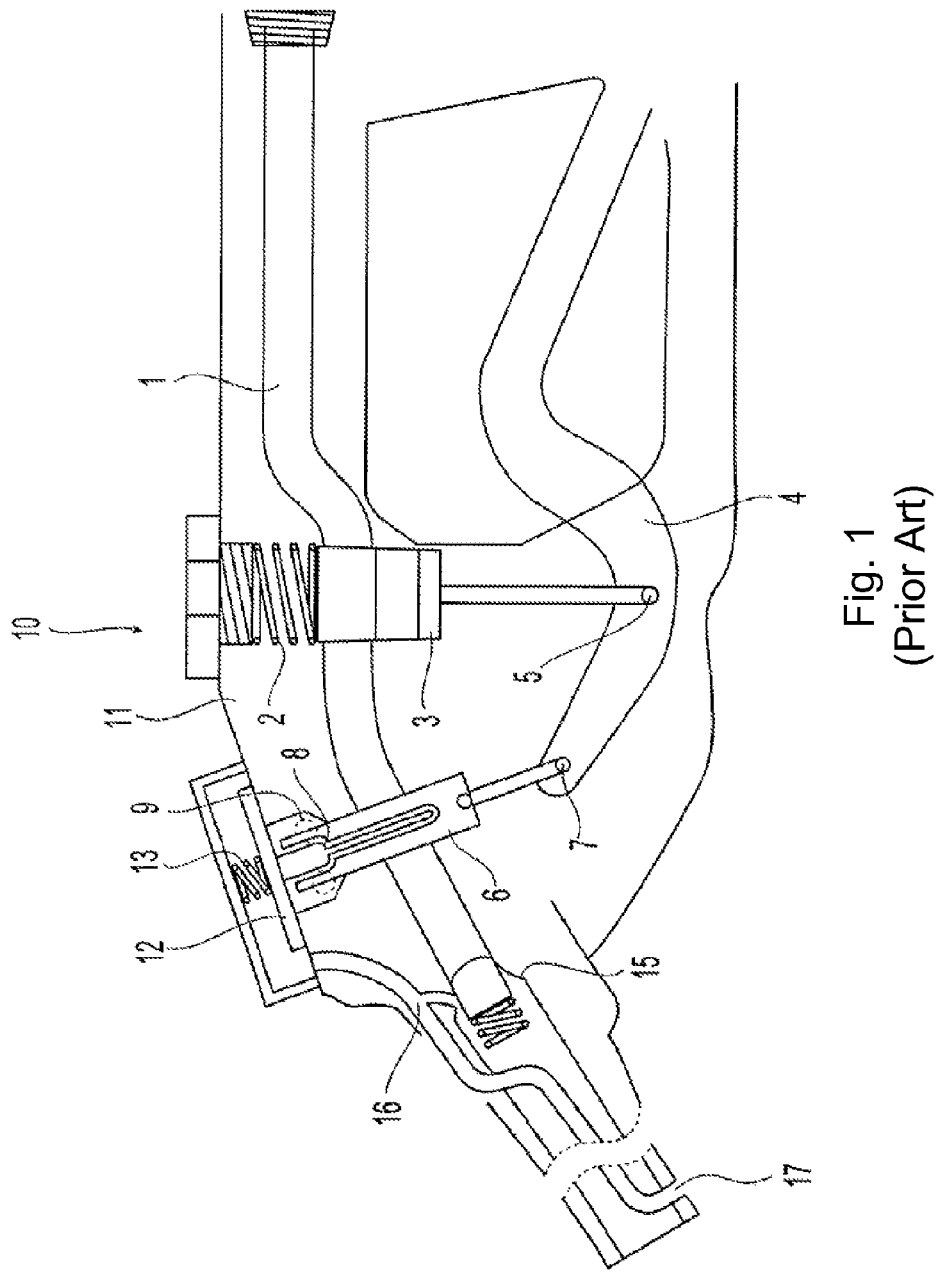
FIG. 1 illustrates a prior art nozzle.

A fill fitting 215 is mounted in an outer end of the fill passage 210 to receive a fill nozzle (such as the nozzle 10 illustrated in FIG. 1). FIGS. 3A and 3B illustrate a front view and cross-section, respectively, of the fill fitting 215. The fill fitting 215 will be described with reference to FIG. 2 as well as to FIGS. 3A and B.

The fill fitting 215 includes a flange portion 220 and a sleeve 225 to receive a fueling nozzle. In the illustrated embodiment, the flange portion 220 includes a mounting flange that sits around the outer end of the fill passage 210, and an inner threaded portion 230 which can receive a sealing cap. In one embodiment, the interior of the sleeve 225 is slightly larger than the outside of a nozzle receiver 235 that is inserted into the sleeve 225 and is locked in an assembled position with a threaded set screw. Alternatively any other method may be used to connect or lock the parts in the assembled position.

The nozzle receiver 235 has a lower end that connects to the interior of the fill passage 210. The interface between the sleeve 225 and the nozzle receiver 235 is sealed with an o-ring 240 but any other method could be used to cause the fill passage 210 to remain fuel and air tight to the exterior of the installation. It should be understood that the fill fitting 215 and nozzle receiver body 245 could also be construed as one piece to perform the same function.

The nozzle receiver 235 is disposed within a nozzle receiver body 245. In the illustrated embodiment, the nozzle receiver 235 fits snugly within the nozzle receiver body 245 in a way that prevents free flow of vapor or liquid between the nozzle receiver body 245 and the nozzle receiver 235. In one embodiment, the nozzle receiver 235 is sealed by an o-ring or any other method as would be understood by one skilled in the art.

The nozzle receiver 235 includes a positioning sleeve 250. The positioning sleeve 250 has a substantially cylindrical central portion with an inner diameter larger than the outer diameter of the nozzle. This central portion can be of varying diameters along its length to accommodate a variety of nozzle sizes in one system. Alternatively it could be straight to accommodate a single nozzle size.

The positioning sleeve 250 also has an upper flange 255 with at least one hole 260 therein, and a lower flange 265. The at least one hole 260 provides a passage for vapor to flow out through the upper opening in the positioning sleeve 250.

The nozzle receiver 235 further includes a nozzle stop 270, a shutoff reservoir 275, and a hole through a lower end 280 of the shutoff reservoir 275. The nozzle stop 270 is disposed within the hole through the lower end 280 of the reservoir 275. The central portion of the positioning sleeve 250 is configured to locate the nozzle in the fill position in the shutoff reservoir 275. When the nozzle is in contact with the nozzle stop 270, the nozzle is in the fill position. The nozzle stop 270 may be a pin pressed into the wall of the nozzle receiver and protruding into the bore of the hole through the lower end of the shutoff reservoir. It should be understood that any other method of controlling the depth of the nozzle is inserted into the nozzle receiver may be used.

A groove, forming the shutoff reservoir 275, is disposed in the central portion of the nozzle receiver 235 between the nozzle stop 270 and the positioning sleeve 250 to form a reservoir around the nozzle with the upper level of the reservoir 275 being above the aspirator hole in the nozzle when the nozzle is in the fill position. The lower portion of the shutoff reservoir 275 may contain multiple diameters or tapers 285 to insure the inserted nozzle is properly located in the fill position. A decrease in the diameter of the lower end 280 of the shutoff reservoir 275 may also be used as a stop for larger nozzle sizes. A seal 290 may be disposed within the shutoff reservoir 275 above the nozzle stop 270 and below the aspirator hole in the nozzle when the nozzle is in the fill position. There can be additional seals 295 of different sizes, disposed in the shutoff reservoir 275 above the nozzle stop 270 and below the aspirator hole in the nozzle to enable a single nozzle receiver 235 to accommodate multiple nozzle sizes. In the illustrated embodiment, each of the seals 290 and 295 are disposed below an aspirator hole of the nozzle, and no seals engage the nozzle above the aspirator hole. However, it should be understood that additional seals may be employed, including seals above the aspirator hole of the nozzle.

There is a lower passage 300 having its open upper end 305 disposed within the flow of liquid from the nozzle, below the nozzle stop 270. The lower passage 300 is configured to fit at least partially within the fill passage 210 and receive at least a portion of fuel flow from the nozzle. As can be seen in FIG. 2, a lower end of the lower passage 300 is in communication with the storage tank 205 via a tank sensor/vent fitting 310 and a hole in the tank. The tank sensor/vent fitting 310 has a mounting flange 315 to mount to the storage tank using a SAE (society of automotive engineers) bolt pattern for fuel level sending units. It will be appreciated that any other means may be used to mount the fitting to the storage tank.

The vent system 200 further includes a tank vent passage 320 having an upper end communicating with the atmosphere during filling of the storage tank 205. With reference to FIGS. 2, 3A, and 3B, vapor may be vented from the storage tank 205 through the vent fitting 310 and tank vent passage 320 to a vent valve body 325. The vapor may then travel through a passage 330 and hole 260, then out through the upper opening in the positioning sleeve 250. Venting of the storage tank 205 to atmosphere through the fill fitting 215 is stopped when filling is complete and a sealing cap is installed.

Venting to the atmosphere when the sealing cap is installed is achieved through a first check valve 335 in the vent valve body 325 that allows passage of vapor from an atmospheric vent passage 340 to the tank vent passage 320 when a vacuum is created in the tank vent passage 320. The first check valve 335 prevents such flow below the minimum vacuum. A second check valve 345 allows passage of vapor from the tank vent passage 320 to the atmospheric vent passage 340 only above a minimum pressure in the tank vent passage 320. The second check valve 345 prevents passage of vapor below that pressure. This second check valve 345 prevents any flow of vapor from the atmospheric vent passage to the tank vent passage. It should be understood that changing the pressure at which the valves open does not alter the intent of this invention.

In the illustrated embodiment, the valve body 325 is located at the fill fitting 215. This keeps the check valves above the storage tank 205 and minimizes the chance of liquid reaching the atmospheric vent passage 340. The first check valve 335 and second check valve 345 combine to prevent liquid from entering the atmospheric vent passage 340 during filling, use, or transportation of the storage tank 205, yet allows air to enter the storage tank 205 as liquid is removed from the tank 205. In alternative embodiments (not shown), the valve body 325 may be located at any position.

Figure 4B:
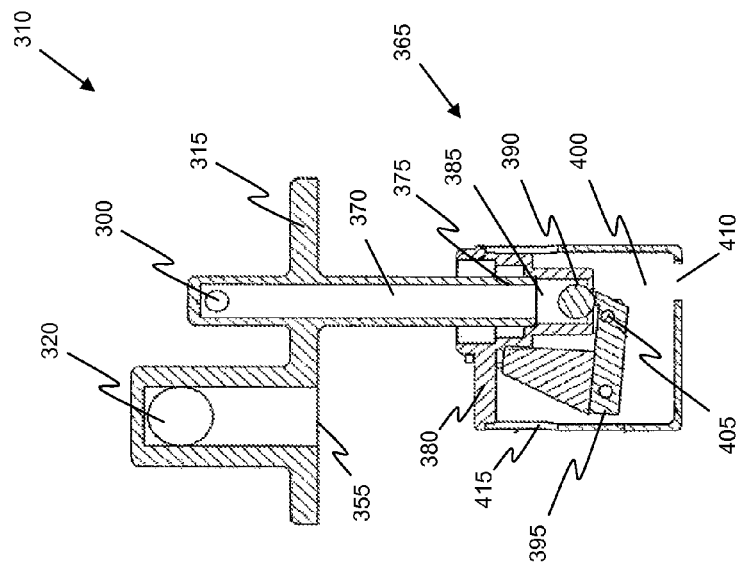
FIG. 4B illustrates a cross-section of the valve 310.
Figure 4A:
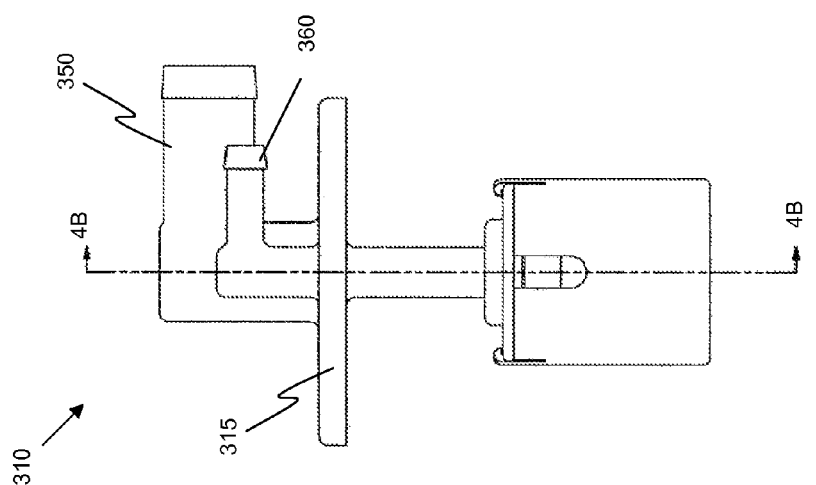
FIG. 4A illustrates a front view of one embodiment of a valve 310 of the fuel spill avoidance system 200.

FIGS. 4A and 4B illustrate a front view and cross-section, respectively, of the vent fitting 310. A first hose barb 350 on the top of the flange 315 accepts the lower end of a tank vent passage 320 and a hole 355 through the flange 315 is in communication with the interior of the storage tank 205 via a hole in the tank. A second hose barb 360 on top of the flange 315 accepts the lower end of the lower passage 300. As would be understood by one skilled in the art, any other method of connecting the passages to the storage tank 205 could be used.

The lower passage 300 is in communication with a valve assembly 365 via a tube 370 extending downward from the flange 315 through a hole in the storage tank 205. The valve assembly 365 is attached to the tube 370 using an instant fitting 375, or other suitable fitting, inserted in a bore through the valve body 380. A counter bore 385 in the valve body 380 has a lower end which has a through hole. The through hole has a diameter smaller than that of a check ball 390. The check ball 390 rests on the bottom of the counter bore 385 and blocks the hole and flow through the valve body 380.

A float 395 is disposed within a chamber 400 of the valve body 380, and has a lever in contact with the check ball 390. The float 395 further has a pivot 405 below the check ball 390. Gravity lowers the float 395 on the pivot 405, causing the lever to lift the check ball 390 off a seat and putting the valve 365 in an open position. The chamber 400 has at least one hole 410 in the bottom portion and at least one hole 415 in the top portion. When the fuel level in the storage tank 205 reaches a predetermined level 421 the float 395 rises on the pivot 405, causing the lever to lower the check ball 390 onto its seat and closing the valve 365. A spring may be used to bias the float 395 in the open position. As would be understood by one with skill in the art any other method may be used to at least partially block the flow through the lower passage.

With reference back to FIG. 3B, an upper passage 420 extends from the lower passage 300 in the liquid spill avoidance system 200. The upper passage 420 has an upper end at the shutoff reservoir 275, and positioned to be in communication with an aspirator hole of the nozzle. A lower end of the upper passage 420 is in communication with the lower passage 300 via a venturi 425.

When the valve 365 in the storage tank 205 is in the open position, liquid flowing through the venture 425 creates a pressure drop in the upper passage 420, insuring that the shutoff reservoir 275 remains free of liquid. When the fuel level in the storage tank 205 reaches a predetermined level 421, the valve 365 is closed, causing the flow through the lower passage 300 to be reduced. The pressure in the lower passage, caused by the flow of liquid from the nozzle into the open upper end 305 of the lower passage 300, is transferred into the upper passage 420 via the venture 425. It should be understood that any other method may be used to cause the pressure in the upper passage 420 to drop as liquid flows through the lower passage 300, and to transfer the flow into the upper passage 420 when a valve reduces the flow from the lower passage 300 into the storage tank 205. For example, in one known embodiment (not shown), an electromagnetic solenoid valve controls the flow of fuel through the upper and lower passages to cause shutoff of the nozzle.

Figure 5:
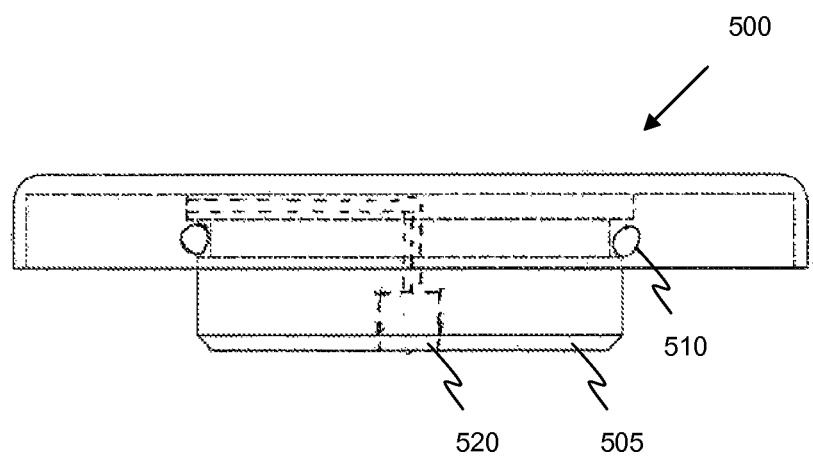
FIG. 5 illustrates one embodiment of a sealing cap.

FIG. 5 illustrates one embodiment of a sealing cap 500. In the illustrated embodiment, the sealing cap 500 includes a threaded cap 505 and a sealing o-ring 510, which, in conjunction with the fill fitting, seals the exterior end of the fill passage 210. The cap 500 further includes an optional pressure relief valve 520 to prevent over pressurizing the tank and fuel storage system if the vent system fails. Alternatively, any other method, as would be understood by one of skill in the art may be used to seal the upper end of the fill passage.

FIGS. 6A and B illustrate a front view and cross section, respectively, of an alternative embodiment of a liquid spill avoidance system 600. The liquid spill avoidance system 600 is substantially the same as the liquid spill avoidance system 200 illustrated in FIGS. 2-4, except the fill passage 610 of the liquid spill avoidance system 600 includes external ridges 620.

Any of the components of the fill fitting described above may be made of plastic, metal or any other suitable material, also the description given should not be considered the only method of construction, the nozzle receiver or any other parts may be one, two, or more pieces assembled to perform the described functions.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A system for preventing overflow in a storage tank which is fillable with liquid via a nozzle having an aspirator hole, the system comprising:
    a fill fitting comprising a mounting flange and a sleeve;
    a nozzle receiver body;
    a nozzle receiver disposed within the nozzle receiver body;
    a seal separating and sealing an interface between the nozzle receiver and the sleeve;
    a nozzle stop;
    a second seal disposed in the nozzle receiver above the nozzle stop and below the aspirator hole of the nozzle;
    a lower passage configured to fit at least partially within a fill passage of a storage tank and receive at least a portion of a flow of liquid from the nozzle;
    an upper passage in communication with the lower passage; and
    a valve configured to direct the flow of liquid from the nozzle to one of the lower passage and the upper passage.

2. The system of claim 1, wherein when a level of liquid in the storage tank is below a predetermined level, the valve is in a first position and liquid is permitted to flow through the lower passage to the storage tank.

3. The system of claim 2, wherein when a level of liquid in the storage tank is above a predetermined level, the valve is in a second position and at least partially blocks the flow of liquid out of the lower passage.

4. The system of claim 1, wherein the nozzle receiver includes a shutoff reservoir.

5. The system of claim 4, wherein the upper passage is in communication with the shutoff reservoir.

6. The system of claim 4, wherein the second seal is disposed about the shutoff reservoir.

7. The system of claim 1, further comprising a venturi for preventing liquid from entering the upper passage.

8. A system for preventing overflow in a storage tank which is fillable via a nozzle, the system comprising:
    a fill fitting comprising a mounting flange and a sleeve;
    a nozzle receiver disposed within a nozzle receiver body and configured to fit within a fill passage of a storage tank;

two or more seals disposed in the nozzle receiver and configured to seal nozzles of different sizes within the nozzle receiver;

a first passage configured to fit at least partially within the fill passage of a storage tank and receive at least a portion of a flow of liquid from the nozzle;

a second passage in communication with the first passage;

a valve having a first position that directs liquid to flow through the first passage and a second position that directs liquid to flow through the second passage; and a vent valve body in communication with the nozzle receiver;

a tank vent passage having a first end in communication with the valve body and a second end in communication with the storage tank; and an atmospheric vent passage having a first end in communication with the valve body and a second end in communication with an external atmosphere.

9. The system of claim 8, wherein the two or more seals are positioned below an aspirator hole of a nozzle received in the nozzle receiver.

10. The system of claim 8, wherein the valve is a solenoid valve.

11. The system of claim 8, further comprising a venturi disposed between the first passage and the second passage.

12. The system of claim 8, wherein the vent valve body includes at least one check valve configured to prevent liquid from entering the atmospheric vent passage.

13. A system for preventing overflow in a storage tank which is fillable via a nozzle, the system comprising:

a fill fitting comprising a mounting flange and a sleeve;

a nozzle receiver disposed within a nozzle receiver body;

a seal separating and sealing an interface between the nozzle receiver and the sleeve;

a shut-off reservoir with a lower portion having multiple diameters, the shut-off reservoir further comprising a second seal and a third seal, the second and third seal having different diameters;

a lower passage configured to fit at least partially within a fill passage of a storage tank and receive at least a portion of a flow of liquid from the nozzle, the lower passage being in communication with the storage tank;

an upper passage in communication with the lower passage; and a solenoid valve configured to direct the flow of liquid from the nozzle to one of the lower passage and the upper passage.

14. The system of claim 13, wherein the reservoir is in communication with the upper passage.

15. The system of claim 14, wherein when a level of liquid in the storage tank is below a predetermined level, the solenoid valve is in a first position and liquid is directed to flow through the lower passage to the storage tank.

16. The system of claim 15, wherein when a level of liquid in the storage tank is above a predetermined level, the solenoid valve is in a second position and liquid is directed to flow through the upper passage to the reservoir in the nozzle receiver.

* * * * *